US008836505B2

(12) United States Patent
Noda et al.

(10) Patent No.: US 8,836,505 B2
(45) Date of Patent: Sep. 16, 2014

(54) ILLUMINATION CONTROL SYSTEM AND METHOD FOR CONTROLLING ILLUMINATION

(75) Inventors: Shuhei Noda, Fuchu (JP); Kenji Baba, Kodaira (JP); Takaaki Enohara, Hino (JP); Kazumi Nagata, Fuchu (JP); Nobutaka Nishimura, Koganei (JP); Yasuo Takagi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 419 days.

(21) Appl. No.: 13/185,801

(22) Filed: Jul. 19, 2011

(65) Prior Publication Data

US 2012/0019168 A1 Jan. 26, 2012

(30) Foreign Application Priority Data

Jul. 20, 2010 (JP) ................................ P2010-162656

(51) Int. Cl.
*G08B 13/00* (2006.01)
*H05B 37/02* (2006.01)
(52) U.S. Cl.
CPC ................................ *H05B 37/0227* (2013.01)
USPC ............................ 340/541; 340/565; 700/291
(58) Field of Classification Search
USPC .................................. 340/541, 565; 700/291
See application file for complete search history.

(56) References Cited

U.S. PATENT DOCUMENTS

| 7,619,366 | B2 | 11/2009 | Diederiks | |
|---|---|---|---|---|
| 7,796,034 | B2 * | 9/2010 | Laski et al. | 340/565 |
| 7,850,338 | B1 * | 12/2010 | Messina et al. | 362/235 |
| 2006/0250237 | A1 * | 11/2006 | Whitten et al. | 340/541 |
| 2009/0213222 | A1 | 8/2009 | Baba et al. | |
| 2011/0074578 | A1 * | 3/2011 | Yablonowski | 340/541 |

FOREIGN PATENT DOCUMENTS

| CN | 1714606 A | 12/2005 |
|---|---|---|
| JP | 5-35877 | 2/1993 |
| JP | 9-312198 | 12/1997 |
| JP | 2002-289377 | 10/2002 |
| JP | 2006-507641 | 3/2006 |
| JP | 2007-200715 | 8/2007 |
| JP | 2008-16289 | 1/2008 |
| JP | 2008-152950 | 7/2008 |
| JP | 2010-9847 | 1/2010 |
| JP | 2010-50069 | 3/2010 |

(Continued)

OTHER PUBLICATIONS

Notification of First Examination Statement issued by the Chinese Patent Office on Jul. 17, 2013, for Chinese Patent Application No. 201110200861.0, and English-language translation thereof.

(Continued)

*Primary Examiner* — Thuy Vinh Tran
(74) *Attorney, Agent, or Firm* — Finnegan, Henderson, Farabow, Garrett & Dunner, L.L.P.

(57) ABSTRACT

According to one embodiment, an illumination control system includes a motion sensor and a central management server. The motion sensor acquires position information and action information of a person. The central management server holds holding position information of an illumination unit and necessary light amount information for action information of the person, acquires a necessary amount of light corresponding to the action information of the person based on the necessary light amount information, calculates a brightness control amount based on the position information of the illumination unit, and controls the illumination unit using the brightness control amount.

13 Claims, 10 Drawing Sheets

(56) References Cited

FOREIGN PATENT DOCUMENTS

| | | |
|---|---|---|
| JP | 2010-102894 | 5/2010 |
| JP | 2010-102900 | 5/2010 |
| JP | 2010-123373 | 6/2010 |
| JP | 2010-123533 | 6/2010 |
| WO | WO 2004/049767 A1 | 6/2004 |
| WO | WO 2008/146232 A1 | 12/2008 |
| WO | WO 2009/122091 A2 | 10/2009 |
| WO | WO 2009/133505 A1 | 11/2009 |

OTHER PUBLICATIONS

Enohara, T. et al., "Air Conditioning Control System and Air Conditioning Control Method," U.S. Appl. No. 12/874,309, filed Sep. 2, 2010.

Nagata, K. et al., "Image Processing Apparatus, Image Processing Method and Air Conditioning Control Apparatus," U.S. Appl. No. 12/877,685, filed Sep. 8, 2010.

Extended European Search Report issued by the European Patent Office on Jun. 26, 2013, for European Patent Application No. 11174069.2.

Notification of Second Examination Statement issued by the State Intellectual Property Office of the People's Republic of China on Mar. 25, 2014, for Chinese Patent Application No. 201110200861.0, and English-language translation thereof.

Notication of Reason(s) for Refusal issued by the Japanese Patent Office on Jan. 28, 2014, for Japanese Patent Application No. 2010-162656, and English-language transition thereof.

* cited by examiner

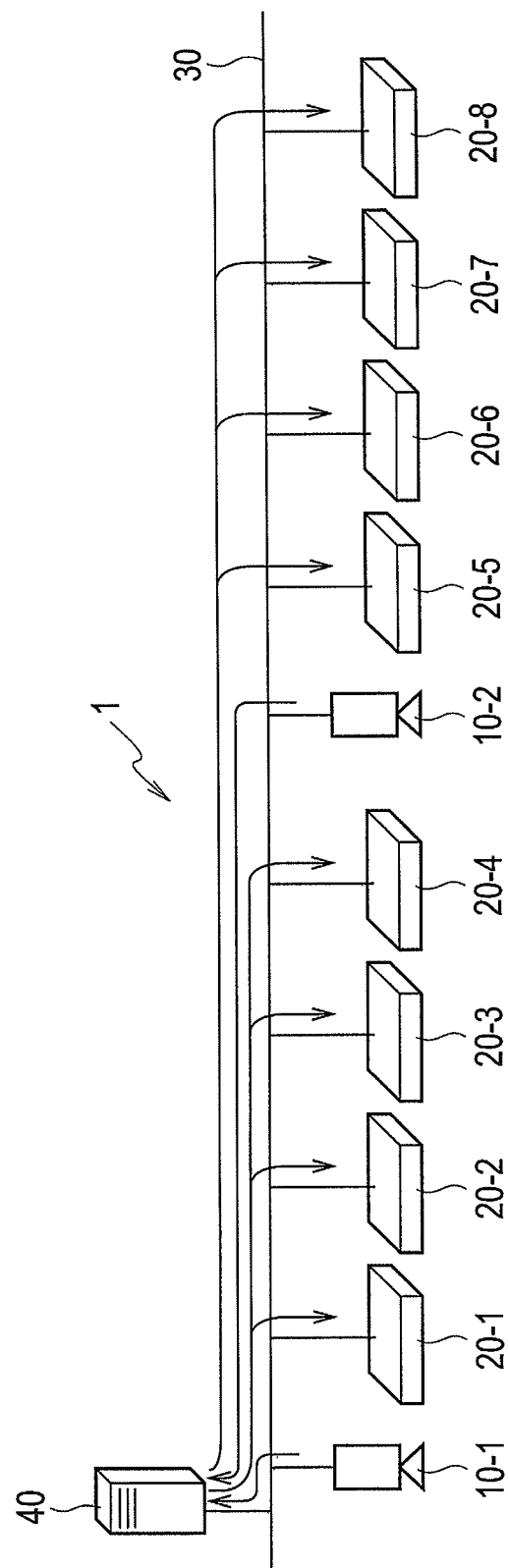

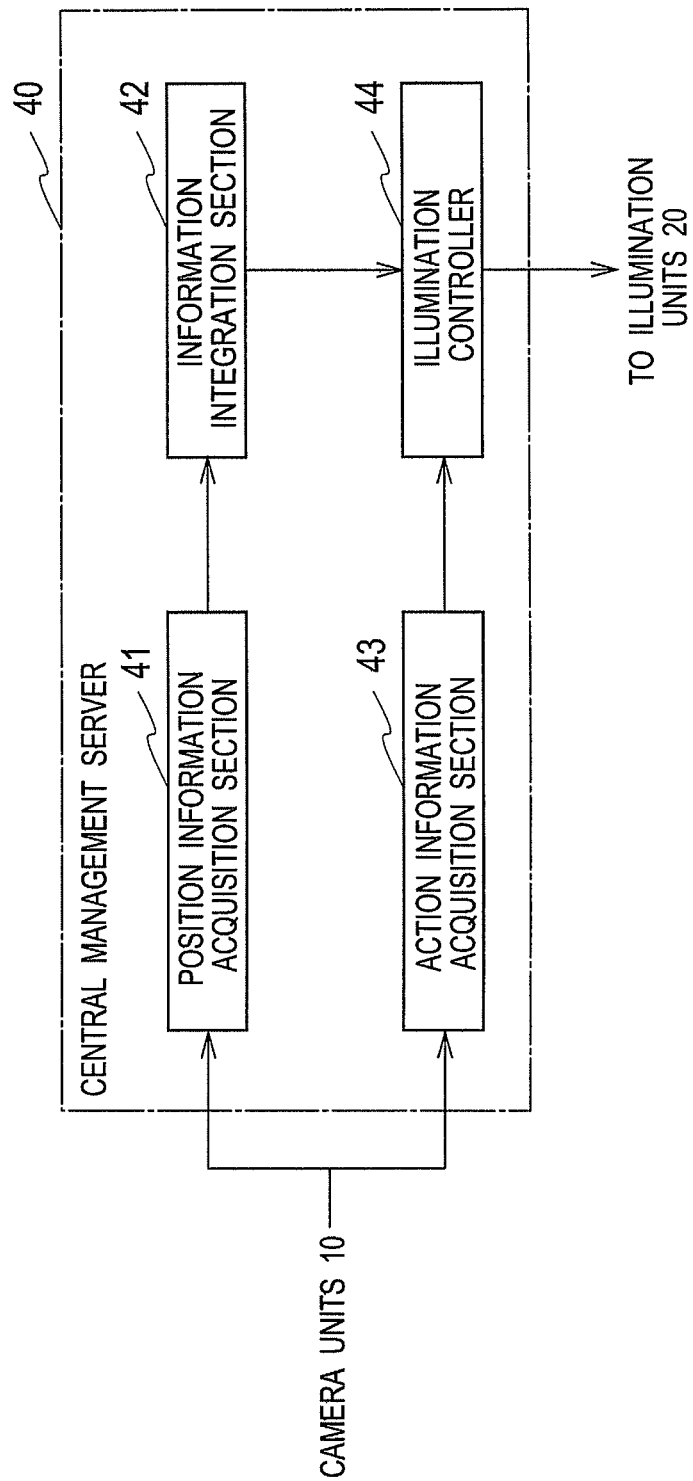

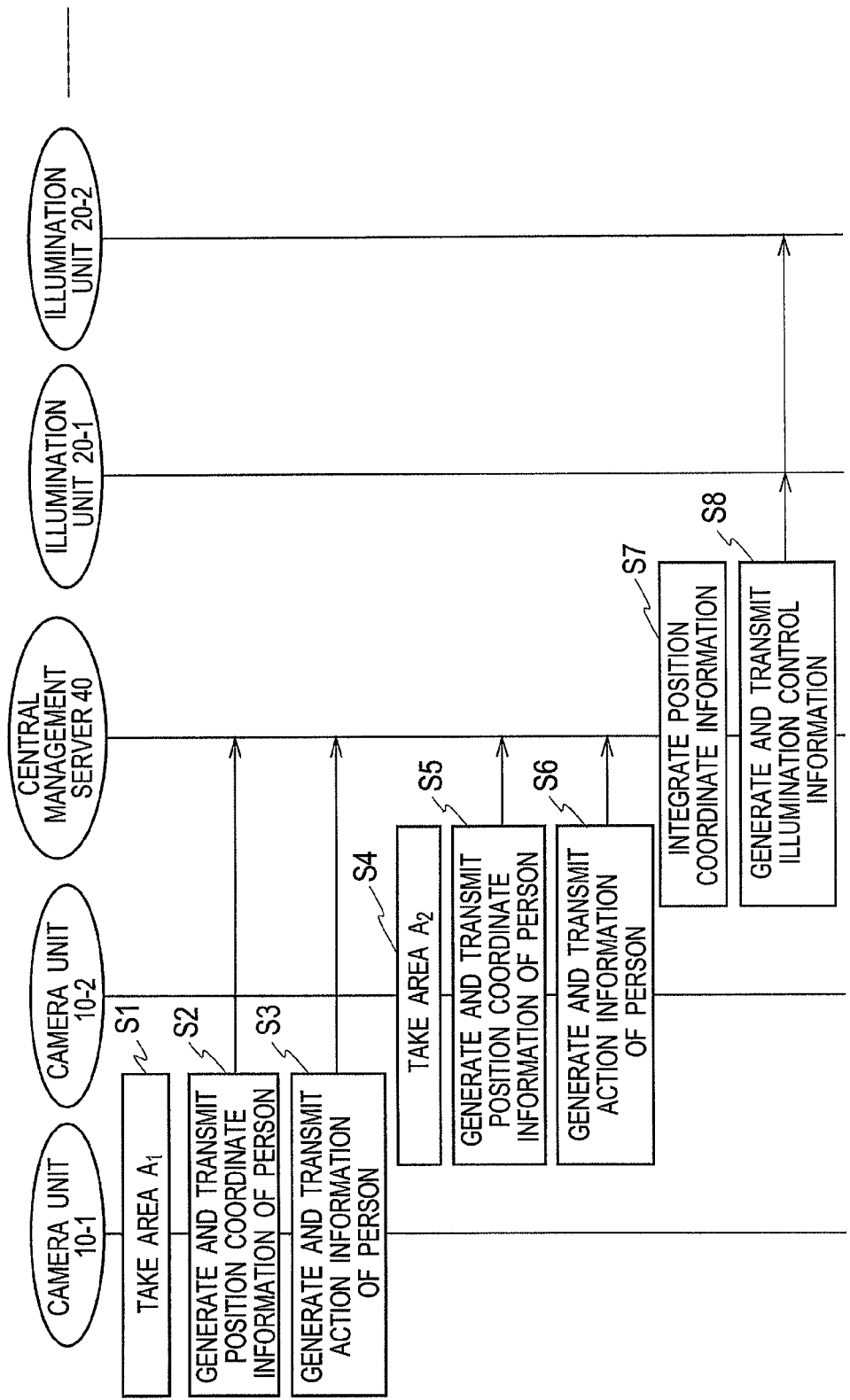

| ACTION | NECESSARY AMOUNT OF LIGHT |
|---|---|
| WALKING | 50% |
| READING | 80% |
| WRITING | 100% |
| PC OPERATION | 70% |

| ACTION | PERSON α | PERSON β |
|---|---|---|
| WALKING | 50% | 50% |
| READING | 80% | 100% |
| WRITING | 100% | 100% |
| PC OPERATION | 70% | 50% |

ILLUMINATION CONTROL SYSTEM AND METHOD FOR CONTROLLING ILLUMINATION

CROSS REFERENCE TO RELATED APPLICATIONS AND INCORPORATED BY REFERENCE

The application is based upon and claims the benefit of priority from Japanese Patent Applications No. P2010-162656, filed on Jul. 20, 2010; the entire contents of which are incorporated herein by reference.

FIELD

Embodiments described herein relate generally to an illumination control system and a method for controlling an illumination.

BACKGROUND

In order to address environmental problems such as global warming, which has been attracting attention in recent years, large facilities including office buildings and commercial facilities are required to operate with less power consumption.

About 21% of energy consumed by such large facilities is used by lighting equipment. Accordingly, a reduction of the energy consumed by lighting equipment is important as an anti-global warming measure.

Lighting equipment is now undergoing a transition from lighting fixtures using fluorescent bulbs to lighting fixtures using light emitting diodes (LEDs).

In contrast to the fluorescent bulbs, the life of the lighting fixtures using LEDs is not shortened by rapidly switching the lighting fixtures on and off. Furthermore, the amount of light of the lighting fixtures using LEDs can be easily adjusted. Due to these characteristics, it can be expected that LED fixtures will reduce the energy consumption of the lighting equipment by careful control of turning off the lighting equipment or reducing the amount of light.

For example, there are many illumination control systems which use infrared motion sensors to determine the presence of people in the room for controlling the switching on and off of fixtures. In the illumination control systems, the lighting equipment is turned on in the presence of people in the room and is turned off in the absence of people.

The infrared motion sensors are capable of precisely sensing moving people such as walking people but in many cases do not sense motionless people such as people who are doing office work.

Moreover, the action of detected people in the room cannot be analyzed with an infrared motion sensor. Accordingly, it is not possible to control the amount of light according to the movement of the detected people. This will sometimes reduce the convenience to people staying in the room or will prevent the provision of the high energy-saving effect.

BRIEF DESCRIPTION OF DRAWINGS

FIG. 1 is an overall view showing a configuration of an illumination control system according to a first embodiment.

FIG. 3 is a block diagram showing a configuration of a central management server of the illumination control system according to the first embodiment.

FIG. 4 is a flowchart showing an operation of the illumination control system according to the first embodiment.

DETAILED DESCRIPTION

According to one embodiment, an illumination control system is connected to an illumination unit installed in a management area. The illumination control system includes a motion sensor and the central management server. The motion sensor acquires position information and action information of a person in the management area. The central management server includes: a necessary light amount holder holding position information of the illumination unit and necessary light amount information for action information of the person; a brightness control calculation unit acquiring a necessary amount of light corresponding to the action information of the person acquired by the motion sensor based on the necessary light amount information held by the necessary light amount holder, and calculating a brightness control amount based on the position information of the illumination unit to set the acquired necessary amount of light at a place indicated by the position information of the person acquired by the motion sensor; and an illumination unit controller controlling the illumination unit using the brightness control amount calculated by the brightness control calculation unit.

Various Embodiments will be described hereinafter with reference to the accompanying drawings.

First Embodiment

Configuration of Illumination Control System of First Embodiment

A description is given of the configuration of an illumination control system according to a first embodiment of the present invention with reference to FIGS. 1 and 2.

The illumination control system 1 according to the embodiment sets a management area to an area A0 composed of areas A1 and A2 adjacent to each other. The illumination control system 1 includes: camera units 10-1 and 10-2 as motion sensors; illumination units 20-1 to 20-4 installed in the area A1 which is shot by the camera unit 10-1; illumination units 20-5 to 20-8 installed in the area A2 which is shot by the camera unit 10-2; and a central management server 40 connected to the camera units 10-1 and 10-2 and the illumination units 20-1 to 20-8 through a network 30 such as a LAN.

Each of the camera units 10-1 and 10-2 takes an image of the target management area thereof and analyzes image information of the taken image to determine the presence of a person staying in the management area. In the presence of a person staying in the area, each camera unit 10-1, 10-2 generates position coordinate information of the person in the image information and action information of the person and sends the position coordinate information of the person in the image information and the action information of the person to the central management server 40 through the network 30.

Figure 2A:
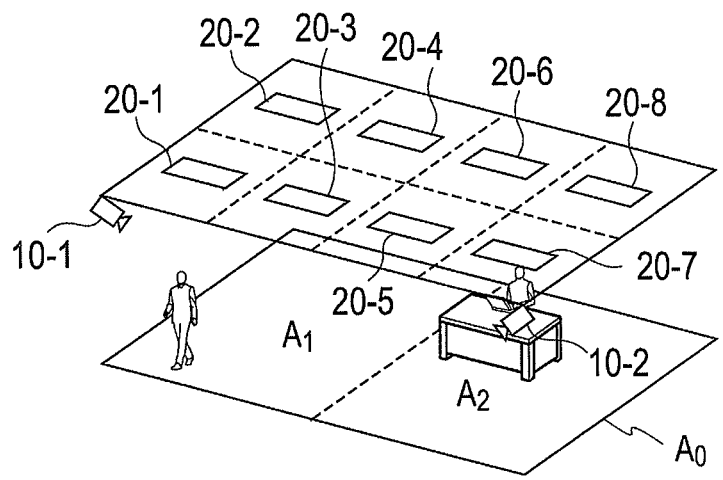
FIG. 2A is an overall view showing a configuration example of the illumination control system according to the first embodiment.
Figure 2B:
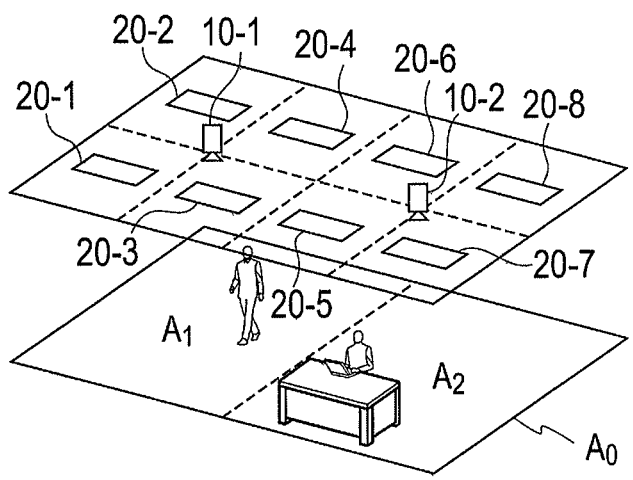
FIG. 2B is an overall view showing another configuration example of the illumination control system according to the first embodiment.
Figure 2C:
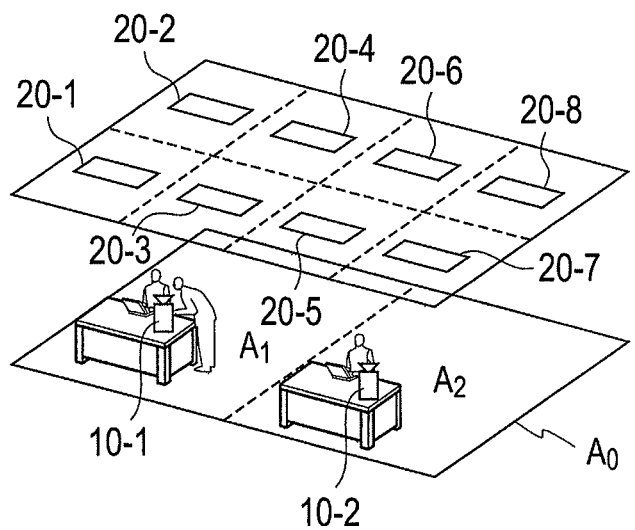
FIG. 2C is an overall view showing a additional configuration example of the illumination control system according to the first embodiment.

These camera units 10-1 and 10-2 may be installed high on the wall as shown in FIG. 2A so as to take images of oblique overhead views of the areas A1 and A2, respectively. Alternatively, the camera units 10-1 and 10-2 may be installed on the ceiling as shown in FIG. 2B so as to take images of overhead views of the areas A1 and A2 or may be installed on desks as shown in FIG. 2C so as to take images of illumination units and persons in the areas A1 and A2.

The camera units 10 may be installed on the ceiling so that the camera units 10 are embedded in the ceiling with only lens part exposed in the room and may be installed so that the entire camera units 10 are accommodated in the room.

Each of the illumination units 20-1 to 20-8 is an illumination device including LEDs. On and off of the illumination units and the amount of light of the illumination units are controlled based on a control instruction transmitted from the central management server 40.

As shown in FIG. 3, the central management server 40 includes a position information acquisition section 41, an information integration section 42, a action information acquisition section 43, and an illumination controller 44.

The position information acquisition section 41 acquires the position coordinate information of persons in the image information which is transmitted from each camera unit 10-1, 10-2.

The information integration section 42 previously holds positional relation information of image shooting ranges of the camera devices 10-1 and 10-2 as a database. The information integration section 42 generates the position coordinate information of each person in the area A0, which is the whole management area, from the position coordinate information of persons in the image information which is acquired by the position information acquisition section 41 and transmitted from the camera units 10-1 and 10-2 and the previously held positional relation information of the image shooting ranges of the camera units 10-1 and 10-2. By generating the position coordinate information of the entire management area in such a manner, the position coordinate information of persons transmitted from the camera unit 10-1 and the position coordinate information of persons transmitted from the camera unit 10-2 are integrated.

The action acquisition section 43 acquires action information of persons in an area which is transmitted from each camera unit 10-1, 10-2.

The illumination controller 44 previously holds position coordinate information of the illumination units 20-1 to 20-8 as a database. The illumination controller 44 calculates a brightness control amount for controlling the amount of light of each illumination unit 20-1 to 20-8 based on the position coordinate information of persons in the area A0 which is integrated by the information integration section 42, the action information of the persons in the area A0 which is acquired by the action information acquisition section 43, and the previously held position coordinate information of the illumination units 20-1 to 20-8. The illumination controller 44 then transmits the calculated brightness control amounts to the corresponding illumination units 20-1 to 20-8 as control instructions.

Operation of Illumination Control System of First Embodiment

Next, the operation of the illumination control system 1 according to the embodiment is described with reference to a sequence chart of FIG. 4.

First, an image of the area A1, which is the management area, is taken by the camera unit 10-1 (S1), and image information of the taken image is analyzed to determine whether there is a person.

If it is determined that there is a person, the image information of the taken image is analyzed to generate the position coordinate information of the person in the image information, which is then transmitted to the central management server 40 through the network 30 (S2).

In this embodiment, each time that the image information of the image taken by each camera unit 10-1 or 10-2 is acquired, the difference in brightness between each pixel in the acquired image information and a pixel corresponding thereto in the previously acquired image information is calculated. If there is a part including pixels whose brightness values change a certain degree or more, it is determined that there is a person. The position coordinates of such a part are generated as the position coordinate information of the person.

If it is determined that there is a person, the image information of the taken image is analyzed to generate the action information of the person, which is then transmitted to the central management server 40 through the network 30 (S3).

In this embodiment, each of the camera units 10-1 and 10-2 is configured to previously learn brightness changing patterns which represent tendencies of changes in brightness values in the image information for each action type such as human walking, and PC operation. When each of the camera units 10-1 and 10-2 acquires the information on the changes in brightness values of a part determined to be a person based on the image information of the taken image, the camera unit 10-1 or 10-2 extracts the most closest one of the learned brightness changing patterns to specify the action of the person. Based on the specified action, the action information of the person is generated.

Similarly in the camera unit 10-2, an image of the area A2 as the management area is taken (S4), and image information of the taken image is analyzed to determine whether there is a person.

If it is determined that there is a person, the image information is analyzed to generate the position coordinate information of the person in the image information, which is then transmitted to the central management server 40 thorough the network 30 (S5).

If it is determined that there is a person, furthermore, the image information of the taken image is analyzed to generate the action information of the person, which is then transmitted to the central management server 40 thorough the network 30 (S6).

In the central management server 40, the sets of position coordinate information of the persons in the image information which are transmitted from the camera units 10-1 and 10-2 are acquired by the position information acquisition section 41 and are then integrated by the information integration section 42 (S7).

The process of integrating the position coordinate information is executed by generating the position coordinate information of each person in the area A0, which is the whole management area, based on the sets of position coordinate information of persons in the image information transmitted from the camera units 10-1 and 10-2 and the previously held positional relation information of the image shooting ranges of the camera units 10-1 and 10-2.

Since the sets of position coordinate information of persons are integrated in consideration of the positional relation information of the image shooting ranges of the camera units in such a manner, even if some of the camera units having image shooting ranges overlapping each other take images of a same person, the persons in the taken images can be counted as the same person without counting the person twice.

Next, based on the position coordinate information of persons integrated by the information integration section 42, the action information of the persons acquired by the action information acquisition section 43, and the previously held position coordinate information of the illumination units 20-1 to 20-8, the brightness control amounts for controlling the amounts of light of the illumination units 20-1 to 20-8 are calculated by the illumination controller 44.

Figures 5, 6:
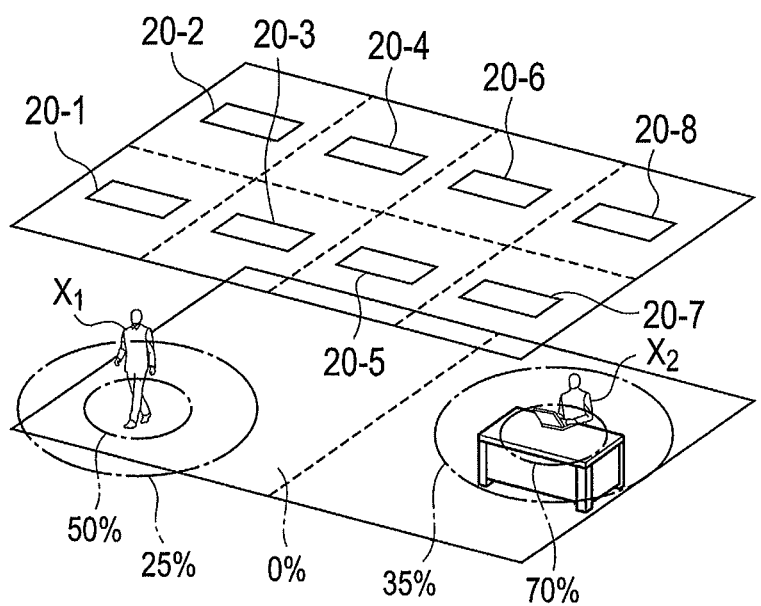
FIG. 5 is an illustration diagram showing an example a database being maintained by the central management server of the illumination control system according to the first embodiment.
FIG. 6 is an overall view showing another configuration example of the illumination control system according to the first embodiment.

The illumination controller 44 previously holds the database indicating the amount of light necessary for each action type as shown in FIG. 5. To calculate the brightness control amount, first, with reference to this database, the amount of light corresponding to the movement of each person is acquired. Furthermore, the necessary amount of light is calculated for each place in the management area A0 which is indicated by the position coordinate information of persons.

FIG. 5 shows the necessary amounts of light for action types with the maximum amount of light of each illumination unit being set to 100. The amount of light necessary for an action type "walking" is set to 50%; "reading", 80%; "writing", 100%; and "PC operation", 70%.

The brightness control amount of each illumination unit 20-1 to 20-8 is calculated so as to satisfy the necessary amount of light in each place (the position of each person) and minimize the total amount of power consumption of the illumination units 20-1 to 20-8.

The brightness control amounts are calculated based on the distances between each person and each illumination unit 20-1 to 20-8, which is calculated based on the position coordinate information of each illumination unit 20-1 to 20-8 and the position coordinate information of each person. As shown in FIG. 6, as for the illumination unit 20-1 near a walking person $X_1$, the necessary amount of light is calculated to 50% based on the database of FIG. 5. As for the illumination unit 20-3 at the predetermined distance from the person $X_1$, the necessary amount of light is 25%, which is lower than the illumination unit 20-1. As for the illumination unit 20-7 near the position coordinates of a person $X_2$ who is doing PC operation, the necessary amount of light is 70% based on the database of FIG. 5. As for the illumination units 20-6 and 20-8 the predetermined distance or more away from the position coordinates of the person $X_2$, the necessary amounts of light are 35%, which is lower than the necessary amount of light of the illumination unit 20-7. The necessary amounts of light of these illumination units 20-1 to 20-8 may have a brightness distribution in which the amount of light is the highest at each person and decreases toward the periphery in a stepwise fashion.

According to the aforementioned first embodiment, the positional information and action information of persons staying in the management area are acquired, and based on the acquired information, the amounts of light of the illumination units at the corresponding positions are individually controlled. This can implement illumination control providing high energy-saving effect without reducing the convenience to persons in the management area.

Moreover, the brightness distribution is formed in such a manner that the amount of light is the highest at each person in the area and decreases towards the periphery. This can implement illumination control which provides brightness not considerably varied by location in the management area and improves the convenience to persons staying in the management area.

In the description of this embodiment, the central management server 40 includes the position information acquisition section 41, information integration section 42, action information acquisition section 43, and illumination controller 44. The central management server 40 may be replaced with an information integration apparatus incorporating the functions of the position information acquisition section 41 and information integration section 42 and an illumination control apparatus incorporating the functions of the action information acquisition section 43 and illumination controller 44, the information integration and illumination control apparatuses being connected to the network 30.

Figure 7:
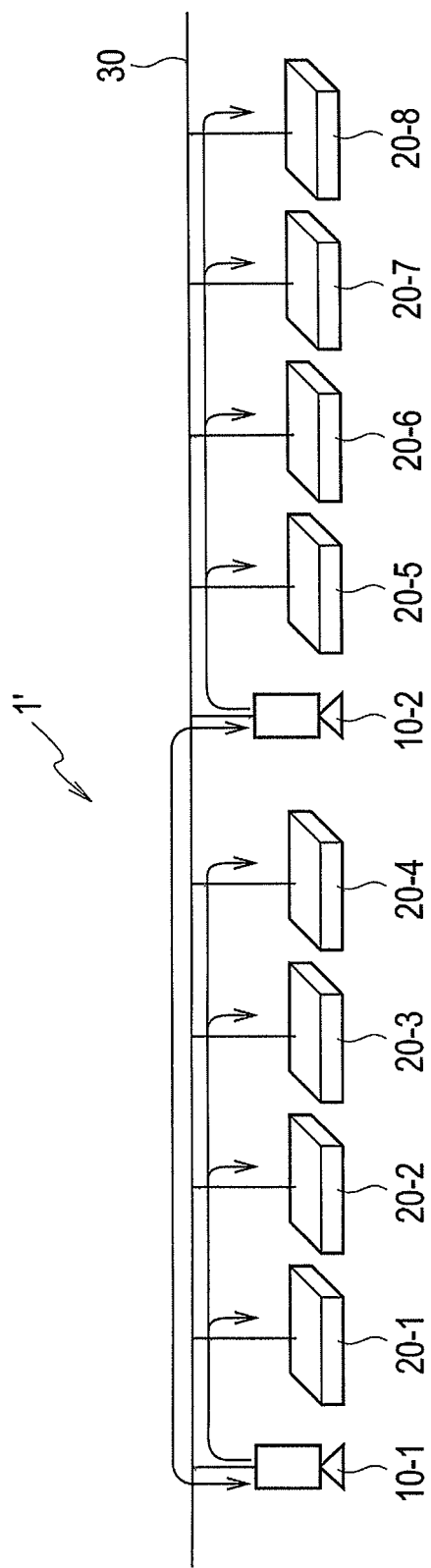
FIG. 7 is an overall view showing another configuration of the illumination control system according to the first embodiment.

Alternatively, the functions of the positional information acquisition section 41, information integration section 42, action information acquisition section 43, and illumination control unit 44 may be incorporated in each camera unit 10-1 or 10-2, without installing the central management server 40. As shown in FIG. 7, the camera units 10-1 and 10-2 acquire the position coordinate information of persons staying in the corresponding areas from each other and then integrate the same, thus constituting an illumination control system 1'.

Moreover, in the description of this embodiment, the illumination control system 1 includes two camera units and eight illumination units. The numbers of cameras and illumination units can be properly changed. Herein, in the case of including only one camera unit, the function of the information integration section described above is unnecessary.

Second Embodiment

Configuration of Illumination Control System of Second Embodiment

Figure 8:
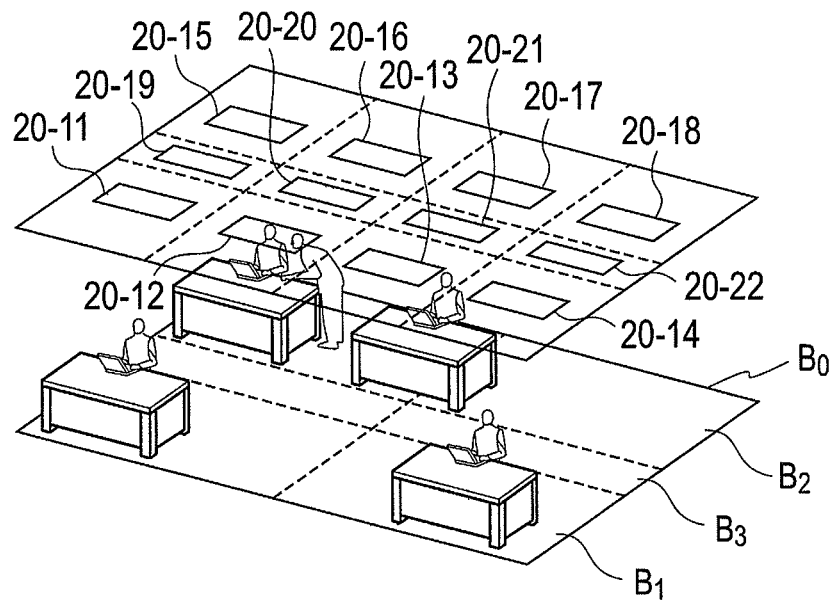
FIG. 8 is an overall view showing a configuration example of the illumination control system according to a second embodiment.

A description is given of the configuration of an illumination control system 2 according to a second embodiment of the present invention with reference to FIG. 8.

The illumination control system 2 according to this embodiment sets the management area to an area B0 composed of a plurality of kinds of areas in which persons perform different actions, for example, desk areas B1 and B2 where desks used for PC operation and the like are placed and an aisle area B3 where persons move by walking. The illumination control system 2 includes: at least one camera unit 10 (not shown) taking images of the management areas; illumination units 20-11 to 20-14 installed in the desk area B1; illumination units 20-15 to 20-18 installed in the desk area B2; illumination units 20-19 to 20-22 placed in the aisle area B3; and a central management server 40 (not shown) connected to the camera unit 10 and the illumination units 20-11 to 20-22 through the network 30 such as a LAN.

The functions of the camera unit 10, illumination units 20-11 to 20-22, and central management server 40 are similar to those of the illumination control system 1 described in the first embodiment, and the detailed description thereof is omitted.

Operation of Illumination Control System of Second Embodiment

In the illumination control system 2 of the embodiment, first, the processes of the steps S1 to S7 of FIG. 4 are executed in the same way as the first embodiment.

Next, based on the position coordinate information of persons which is integrated by the information integration section 42, the action information of the persons which is acquired by the action information acquisition section 43, and position coordinate information of the illumination units 20-11 to 20-22 previously held by the illumination controller 44, brightness control amounts for controlling the amounts of light of the illumination units 20-11 to 20-22 are calculated by the illumination controller 44.

The process executed by the illumination controller 44 to calculate the illumination control amounts is described. In this embodiment, the illumination controller 44 previously holds a database indicating the correspondence relation between the position coordinates of the management areas and the area types and the necessary amounts of light of the action types of persons for each area type which is a type of the management area.

To calculate the illumination control amounts, first, with reference to this database, the area type corresponding to the position coordinate information where each person is located is specified. The necessary amount of light corresponding to the action of each person for the specified area type is then acquired. Furthermore, the necessary amount of light in each place of the management area B0 is calculated based on the position coordinate information of each person.

The brightness control amounts of the illumination units 20-11 to 20-22 are calculated based on the position coordinate information of the illumination units 20-11 to 20-22 so as to satisfy the calculated necessary amount of light for each place (including the position of each person in the area B0) and minimize the total power consumption of the illumination units 20-11 to 20-22.

For example, when there is a walking person only in the aisle area B3 and there is no person in the desk areas 131 and B2, the brightness control amount is calculated so as to equally increase the amounts of light of all of the illumination units 20-11 to 20-22 for the purpose of ensuring the safety of the walking person. When there are persons doing PC operation only in the desk areas B1 and B2 and there is no person in the aisle area B3, the brightness control amounts are calculated so as to increase the amounts of light of the illumination units 20-11, 20-14, 20-15, 20-16, and 20-17 near the position coordinates of the persons and equally decrease the amounts of light of the illumination units 20-12, 20-13, and 20-18 near the position coordinates of the desk areas B1 and B2 where there are no persons and the illumination units 20-19 to 20-22 in the aisle area B3.

This is illumination control called task-ambient lighting (task-ambient illumination), which can reduce the power consumption of the entire management area without reducing the convenience to persons in the management area.

The calculated brightness control amounts are transmitted to the corresponding illumination units 20-11 to 20-22.

According to the aforementioned second embodiment, it is possible to perform illumination control suitable to each area. It is therefore possible to further improve the convenience to persons in the management area and provide a high energy saving effect.

In the description of the aforementioned embodiment, the illumination control section 44 previously holds the database indicating the correspondence relation between the position coordinates of the management areas and the area types and the necessary amounts of light of each action for each area type, which is the type of each management area. However, the desk and aisle areas in the management area may be automatically set by accumulating and learning movement trajectory information of a plurality of persons from images which are taken by the camera units 10-1 and 10-2 for a predetermined period of time.

The movement trajectory information can be obtained in the following manner: each time that the position coordinates of the persons are acquired (for example, every one second), the acquired position coordinates of persons in the management area are compared with the position coordinates of the persons previously acquired, and the persons having the position coordinates close to each other are related to each other and are determined to be a same person. This process is consecutively performed.

Figure 9:
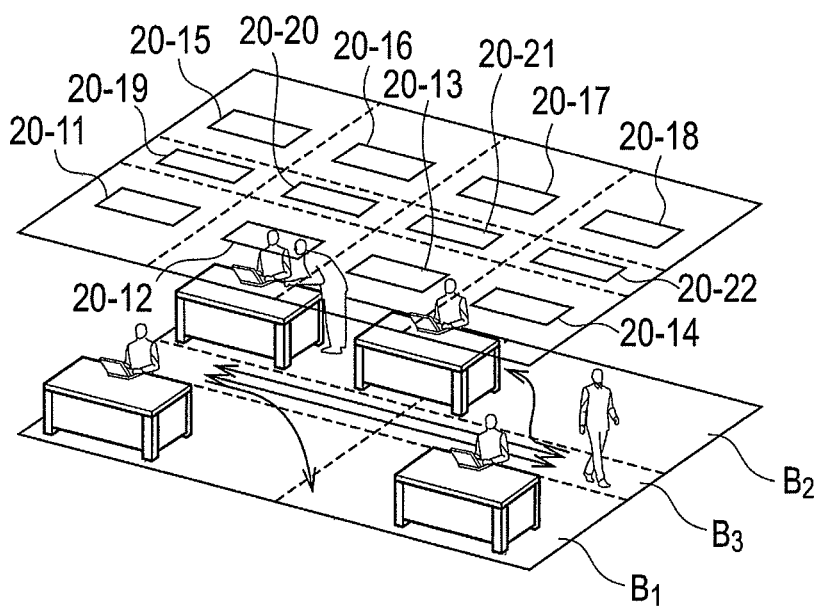
FIG. 9 is an illustration diagram showing a state when area type is determined in the illumination control system according to the second embodiment.

For example, as shown in FIG. 9, the area B2 where a lot of movement trajectories of the walking persons are detected is determined as an aisle area, and the areas B1 and B2 where it is detected that the persons are staying still or are doing PC operation more frequently than movement trajectories are determined as desk areas. The management area can be thus divided into the desk and aisle desk areas.

Third Embodiment

Configuration of Illumination Control System of Third Embodiment

An illumination control system 3 according to the third embodiment according to the present invention has a similar configuration to the illumination control systems according to the first and second embodiments except that the camera unit 10 includes a person identification determination function. The detailed description of the constituent components having the same function is omitted.

The camera unit 10 in this embodiment generates the position coordinate information and action information of persons in the management area based on the image information of the taken image, identifies the persons through the person identification determination function to generate the person identification information, and then sends the generated person identification information together with the position coordinate information and action information to the central management server 40 through the network 30.

This person identification determination is executed by a method using biometrics authentication, an identification method of acquiring authentication information of persons in the management area, or the like. In the method using biometrics authentication, each person is identified based on the characteristics of an image of the person's face or characteristics of the person's walking motion acquired by an analysis of the image information of the taken image. In the method of acquiring authentication information from the authentication apparatus, the authentication information of each person is acquired from an authentication apparatus which is installed at the entrance and uses an IC card or the like. The movement of the person is followed in the taken video image and is related to the authentication information.

Operation of Illumination Control System of Third Embodiment

In the illumination control system 3 according to this embodiment, first, the processes of the steps S1 to S7 of FIG. 4 are executed in a similar way to the first embodiment.

Next, from the position coordinate information of persons in the management area which is integrated by the information integration section 42 and the action information of the persons in the management area which is acquired by the action information acquisition section 43, the brightness control amount for controlling the amount of light of each illumination unit is calculated by the illumination controller 44 based on the position coordinate information of each illumination unit previously held by the illumination controller 44.

Figures 10, 11:
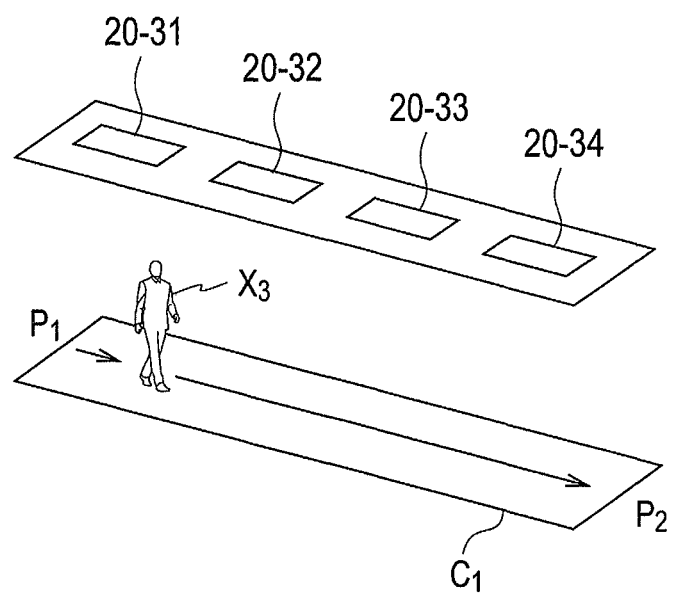
FIG. 10 is an illustration diagram showing an example a database being maintained by the central management server of the illumination control system according to a third embodiment.
FIG. 11 is an overall view showing a configuration example of the illumination control system according to a fourth embodiment.

The process executed by the illumination controller 44 to calculate the illumination control amount is described. In this embodiment, the illumination controller 44 previously holds a database indicating the necessary amounts of light of each action of previously set persons as shown in FIG. 10. At calculating the brightness control amount, with reference to this database, the necessary amount of light corresponding to the action of each person is calculated. Furthermore, the necessary amount of light for each place in the management area A0 is calculated based on the position coordinate information of each person.

FIG. 10 shows the necessary amount of light for each action of each person with the maximum light amount of the illumination unit being set to 100. As for a person α, the necessary amount of light for the action "walking" is set to 50%; the action "reading", 80%; the action "writing", 100%; and the action "PC operation", 70%. As for a person β in the room, the necessary amount of light for the action "walking" is set to 50%; the action "reading", 100%; the action "writing", 100%; and the action "PC operation", 50%.

The brightness control amount of each illumination unit is calculated based on the position coordinate information of the illumination unit so as to satisfy the amount of light necessary for each place (the position of each person in the management area) and minimize the total power consumption of the illumination units 20-1 to 20-8.

According to the aforementioned third embodiment, the necessary amounts of light are previously set based on the preference of each person. This can implement personal illumination control capable of improving the convenience to persons in the management area.

Fourth Embodiment

Configuration of Illumination Control System of Fourth Embodiment

A description is given of the configuration of an illumination control system according to a fourth embodiment of the present invention with reference to FIG. 11.

The illumination control system 4 according to the fourth embodiment of the present invention sets the management area to an aisle area $C_1$. The illumination control system 4 includes a camera unit 10 (not shown) taking an image of the aisle area $C_1$, illumination units 20-31 to 20-34 placed in the aisle area $C_1$, and a central management server 40 (not shown) connected to the camera unit 10 and the illumination units 20-31 to 20-34 through a network 30 such as a LAN.

The functions of the camera unit 10, illumination units 20-31 to 20-34, and central management server 40 are the same as those of the illumination control system 1 described in the first embodiment, and the detailed description thereof is omitted.

Operation of Illumination Control System of Fourth Embodiment

In the illumination control system 4 of this embodiment, first, the processes of the steps S1 to S7 of FIG. 4 are executed in a similar way to the first embodiment.

Next, based on the position coordinate information of persons in the management area which is integrated by the information integration section 42, the action information of the persons which is acquired by the action information acquisition section 43, and the previously stored position coordinate information of the illumination units 20-31 to 20-34, the brightness control amounts for controlling the amounts of light of the illumination units 20-31 to 20-34 are calculated by the illumination controller 44.

The brightness control amounts are acquired based on the distance between each of the illumination units 20-31 to 20-34 and the position coordinates of each person and the action information of the person or are calculated based on the tendencies of movement which are obtained by statistical processing of accumulated past trajectory information. For example, as shown in FIG. 11, if a person $X_3$ is detected moving from $P_1$ toward $P_2$ in the management area $C_1$ based on the action information, the brightness control amounts are calculated so as to increase not only the illumination units 20-31 and 20-32 placed near the position coordinates of the person $X_3$ but also the amounts of light of the illumination units 20-33 and 20-34 placed in the direction that it is predicted that the person $X_3$ is more likely to move.

By such illumination control based on the predicted direction of the movement of each person, it is possible to ensure the safety of walking persons and furthermore improve the convenience to persons in the management area.

Figure 12:
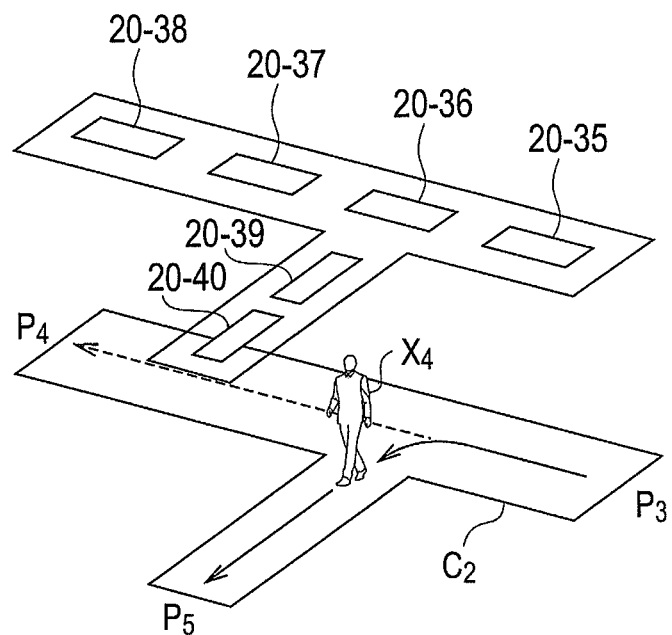
FIG. 12 is an overall view showing another configuration example of the illumination control system according to the fourth embodiment.

In the above description of this embodiment, the management area is the aisle area $C_1$ extending in one direction. However, the management area may be an aisle area $C_2$ branched to have a T shape as shown in FIG. 12, for example. In the aisle area $C_2$, the movement tendencies of a plurality of persons at the fork are previously learned and held in the illumination controller 44. When a person $X_4$ moves to the fork from $P_3$, it is predicted based on the learning result that the person $X_4$ is more likely to move toward $P_5$ than toward $P_4$. The illumination control may be performed so as to increase the amounts of light of the illumination units 20-39 and 20-40 in the direction toward $P_5$ and not increase the amounts of light of the illumination units 20-37 and 20-38 in the direction toward $P_4$.

In another mode, the illumination control may be performed as follows. The image of the face of each person in the management area is extracted from image information of the image taken by the camera unit 10. Based on the detected orientation of the face, information of the direction that the person is walking is acquired, and based on the information of the direction, the direction that the person is more likely to move is predicted. The amounts of light of only the illumination units located in the predicted direction are increased.

Such illumination control can ensure the safety of walking persons in the management area and enhance the energy-saving effect.

Fifth Embodiment

Configuration of Illumination Control System of Fifth Embodiment

An Illumination Control System 5 according to a Fifth Embodiment of the Present invention has a similar configuration to that of the illumination control system of any one of the first to fourth embodiments except that the camera unit 10 includes an operation mode switching function to switch the operation mode between a security operation mode of performing security management and a normal operation mode of not performing security management. The detailed description of the constituent components having the same functions are omitted.

Operation of Illumination Control System of Fifth Embodiment

In the illumination control system 5 according to this embodiment, at executing the illumination control process, the operation mode of the camera unit 10 is switched based on a predetermined condition between the security operation mode of performing the security management and the normal operation mode of not performing the security management.

The predetermined condition is set based on the time, the presence of inputted instruction, information acquired from a schedule management system such as a management area reserving system, and the like.

If it is determined based on a timer incorporated in the camera unit 10 that it is nighttime, the operation mode is switched to the security mode, and if it is determined that it is daytime, the operation mode is switched to the normal mode. Moreover, the operation mode is set to the normal operation mode by default and is switched to the security operation mode when an instruction to switch the operation mode to the security operation mode is inputted from the outside through an operation of an administrator or the like. Furthermore, the operation mode is set to the normal operation mode when the management area is reserved by the schedule management system and is switched to the security operation mode when the management area is not reserved.

When the operation mode is switched to the security operation mode, if it is detected based on the image information of the taken image that there is a person in the management area, it is determined that the detected person can be a stranger. The image information is then outputted so as to be stored in the unit itself or in an external apparatus such as the illumination control unit or to be transmitted to a monitoring center where people are monitoring videos or the like.

According to the aforementioned fifth embodiment, if there is a person detected in the nighttime or in a place not scheduled to be used, the image information of the detected person is stored. This can improve the security management ability.

Sixth Embodiment

Configuration of Illumination Control System of Sixth Embodiment

Figure 13:
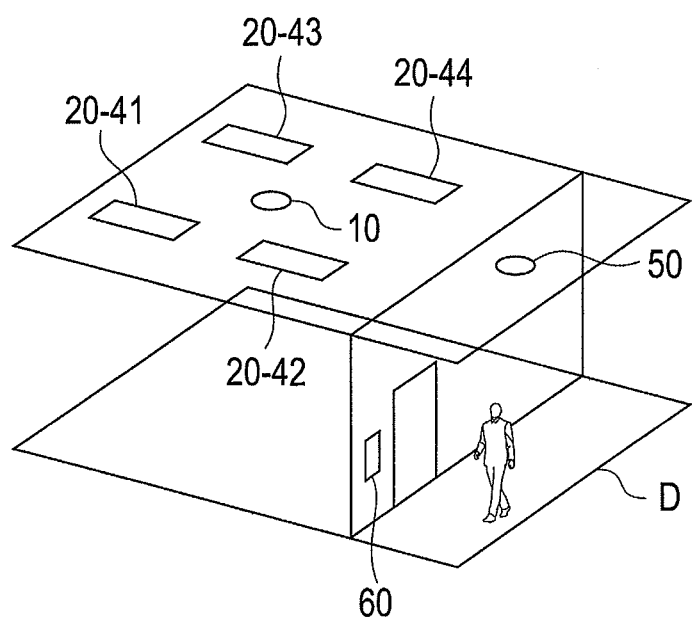
FIG. 13 is an overall view showing a configuration example of the illumination control system according to a six embodiment.

A description is given of the configuration of an illumination control system 6 according to a sixth embodiment of the present invention with reference to FIG. 13.

The illumination control system 6 according to the sixth embodiment of the present invention sets the management area to an area D and includes a camera unit 10 taking an image of the area D, illumination units 20-41 to 20-44 installed in the area D, a motion sensor 50 or authentication unit 60 installed outside of the entrance of the area D, and the central management server 40 (not shown) connected to the camera unit 10, illumination units 20-41 to 20-44, and motion sensor 50 or authentication unit 60 through a network 30 such as a LAN.

The functions of the camera unit 10, illumination units 20-41 to 20-44, and central management server 40 are the same as those of the illumination control system 1 described in the first embodiment, and the detailed description thereof is omitted.

The motion sensor 50 is an infrared sensor, an ultrasonic sensor, a distance sensor, or the like and detects the presence of a human being based on changes in the environment of neighboring space, including the temperature, pressure, light, sound waves, electromagnetic waves, and the like.

The authentication unit 60 is a device which uses a radio frequency identification (RFID) tag or an IC card reader and is operated by a human being who is entering to detect the presence of the human being.

Operation of Illumination Control System of Sixth Embodiment

In the illumination control system according to this embodiment, when the human sensor 50 detects that a person who is going to enter the area D approaches the outside of the entrance of the area D as the management target, or when the authentication unit 60 at the entrance of the area D is operated to detect that there is a person who is going to enter the area D, the amounts of light of the illumination units 20-41 to 20-44 (or only the illumination units 20-42 and 20-44 near the entrance) within the area D are controlled by the central management server 40 so as to increase.

According to the aforementioned sixth embodiment, the infrared sensor, ultrasonic sensor, distance sensor, or the like, which is little influenced by the surrounding brightness, is placed near the entrance of the management area. This can ensure the safety of persons entering the area and increase the convenience thereof even in the nighttime or the like when the camera unit's ability of detecting the presence of a human being is degraded. Moreover, by turning on the illumination units, the brightness necessary for the camera unit to take an image can be ensured.

After the person enters the area D, the illumination control is performed as shown in the first to fifth embodiments. It is therefore possible to ensure the safety of walking persons and perform control with a high energy-saving effect.

Seventh Embodiment

Configuration of Illumination Control System of Seventh Embodiment

An illumination control system 7 according to a seventh embodiment of the present invention has a same configuration as the configuration of any one of the illumination control systems according to the first to sixth embodiments, and the detailed description of the constituent components having the same functions is omitted.

In this embodiment, the camera unit 10 generates the position coordinate information and action information of persons staying in the management area from image information of the taken image and moreover uses a marker determination function to determine gestures performed by persons staying in the management area, presentments presented by persons in the management area, and the like as marker information and generate marker determination information. The camera unit 10 transmits the marker determination information together with the position coordinate information and the action information to the central management server 40 through the network 30.

In the marker determination, an image of a marker is previously learned and held, for example. If a partial image having high similarity to the learned image of the maker is detected near the position coordinates of a person, it is determined that the corresponding marker is presented. Alternatively, a change in brightness in video information obtained when a person performs a particular gesture is previously learned and held, and if a change in brightness similar to the previously held change is detected, it is determined that the above gesture is performed.

Operation of Illumination Control System of Seventh Embodiment

In the illumination control system 7 according to this embodiment, first, the processes of the steps S1 to S7 of FIG. 4 are executed in a similar way to the first embodiment.

Next, from the position coordinate information of persons in the management area which is integrated by the information integration section 42 and the action information of persons in the management area which is acquired by the action information acquisition section 43, the brightness control amounts for controlling the amounts of light of illumination units are calculated by the illumination controller 44 based on the position coordinate information of the illumination units previously held by the illumination controller 44.

The process executed by the illumination controller 44 to calculate the brightness control amount is described. In this embodiment, the illumination controller 44 stores a database indicating the previously set necessary amount of light for each gesture or marker, or increases or decreases in the amounts of light.

At calculating the brightness control amount, with reference to the database, if it is determined from the video information taken by the camera unit 10 that a person performs a gesture whose information is held in the database or it is determined that the person presents a presentment, the necessary amount of light corresponding to the marker such as the gesture or presentment is calculated.

According to the aforementioned seventh embodiment, for example, the amount of light of an illumination unit can be increased when a certain person in the management area performs a gesture of raising a hand or can be reduced when a person in the management area presents a card of a particular color. Accordingly, the illumination control can be easily performed by an action of each person in the management area.

Moreover, if the information of the database is set for each person in the management area, it is possible to perform personal illumination control carefully suited to each person.

For example, when a certain person performs a gesture of raising a hand to increase the amount of light of an illumination unit and then moves to another area, the amount of light in the area to which the person moves can be controlled so as to increase with reference to the history of the previous action.

Eighth Embodiment

Configuration of Illumination Control System of Eighth Embodiment

Figure 14:
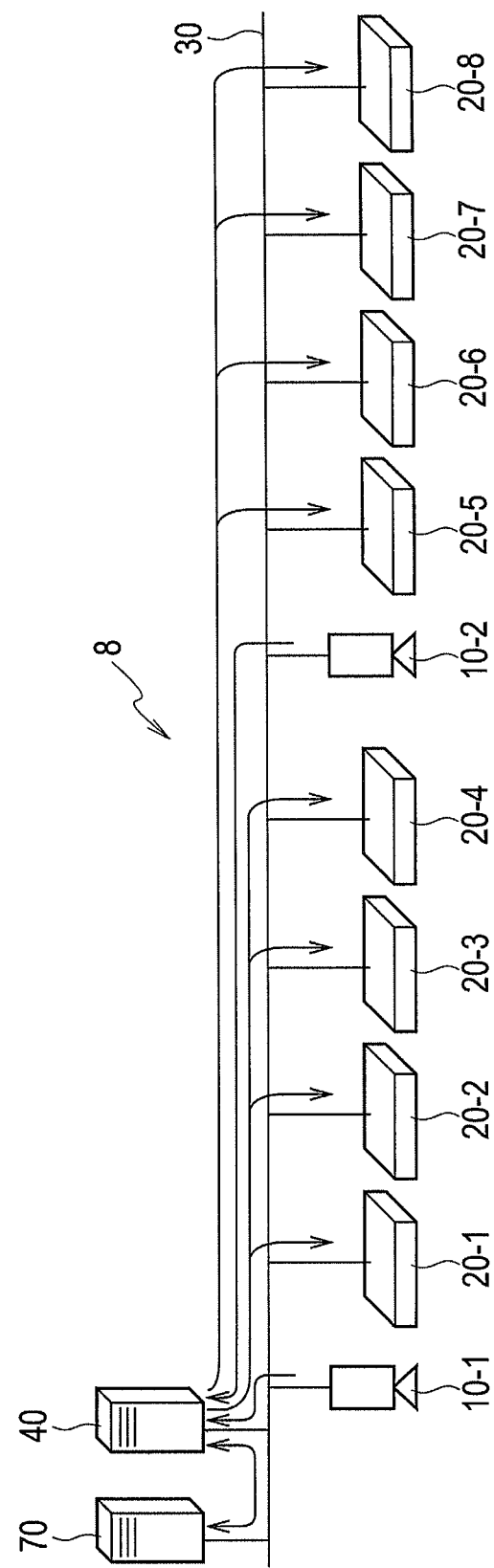
FIG. 14 is an overall view showing a configuration of the illumination control system according to an eighth embodiment.

A description is given of the configuration of an illumination control system according to an eighth embodiment of the present invention with reference to FIG. 14.

The illumination control system 8 according to the eighth embodiment of the present invention has a similar configuration to the illumination control system 1 shown in FIG. 1 except that a database server 70 is connected to the network 30. The detailed description thereof is omitted.

The database server 70 acquires detection result information of persons in the management area, movement trajectory information, illumination control history information, image and video information obtained by the camera unit, and the like from the central management server 40 and stores the same.

Operation of Illumination Control System of Eighth Embodiment

In the illumination control system 8 according to this embodiment, the detection result information of persons in the management area, the movement trajectory information, illumination control history information, image and video information obtained by the camera unit, and the like, which are acquired by the central management server 40 through the processes described in the first to seventh embodiments, are accumulated.

Upon a request from a display unit (not shown) connected to the central management server 40 or network 30, desired information of the aforementioned accumulated information is acquired and displayed to be provided for the administrator or persons.

The administrator and persons access such information and therefore confirm the operation of illumination control and the energy saving effect.

In the aforementioned description of this embodiment, the database server 70 is connected to the network 30 as a device different from the central management server 40. The database server 70 is not limited to that and may be configured to be incorporated in the central management server 40. Moreover, if the central management server 40 may be replaced with an information integration apparatus incorporating the functions of the position information acquisition section 41 and information integration section 42 and an illumination control apparatus incorporating the functions of the action information acquisition section 43 and illumination controller 44. In such a case, any one of the information integration apparatus and illumination control apparatus may be configured to incorporate the function of the database server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination control system connected to an illumination unit installed in a management area, the system comprising:
   a motion sensor acquiring position information of a person and action information of the person in the management area;
   a necessary light amount holder holding position information of the illumination unit and necessary light amount information for the action information of the person;
   a brightness control calculation unit acquiring a necessary amount of light corresponding to the action information of the person acquired by the motion sensor based on the necessary light amount information held by the necessary light amount holder, and calculating a brightness control amount based on the position information of the illumination unit to set the acquired necessary amount of light at a place indicated by the position information of the person acquired by the motion sensor; and
   an illumination unit controller controlling the illumination unit using the brightness control amount calculated by the brightness control calculation unit.

2. The system of claim 1, wherein the motion sensor is a camera unit installed on one of a wall, a ceiling, and a desk in the management area.

3. The system of claim 2, wherein the camera unit includes a unit switching the camera unit to a security operation mode of storing image information of an image taken when the presence of a person is detected.

4. The system of claim 1, further comprising an entering person detection unit composed of any one of an infrared sensor, an ultrasonic sensor, a distance sensor, an RFID tag, and an IC card reader and is installed at an entrance of the management area, wherein the brightness control calculation unit calculates the brightness control amount to increase the amount of light of the illumination unit in the management area when the entering person detection unit detects an entering person.

5. The system of claim 1, wherein based on a distance calculated from the position information of the person in the management area and the position information of the illumination unit, the brightness control calculation unit calculates the brightness control amount of the illumination unit to form a distribution of light amount which is the highest at the person and decreases away from the person in a stepwise fashion.

6. The system of claim 1, wherein
   the management area is composed of a plurality of types of areas in which the person performs different actions,
   the necessary light amount holder holds a necessary amount of light of each action of the person for each area type, and
   the brightness control calculation unit specifies an area type corresponding to the position information of the person acquired by the motion sensor based on the held necessary light amount information, acquires the necessary amount of light corresponding to the action information of the person in the specified area type, and calculates the brightness control amount of the illumination unit to set the acquired necessary light amount at the place indicated by the position information of the person acquired by the motion sensor.

7. The system of claim 6, wherein the area type is set based on movement trajectory information of the person obtained by the motion sensor and accumulated.

8. The system of claim 1, wherein
   the motion sensor includes a person identification determination unit,
   the necessary light amount holder holds the position information of the illumination unit and the necessary light amount information for the action information of the person, and
   the brightness control calculation unit acquires a necessary amount of light corresponding to the action information of the person determined by the motion sensor based on the held necessary light amount information, and calculates the brightness control amount of the illumination unit to set the acquired necessary amount of light at the place indicated by the position information of the person acquired by the motion sensor.

9. The system of claim 1, wherein the brightness control calculation unit acquires the movement trajectory information of the person in the management area acquired by the motion sensor and accumulated, predicts a direction that the person moves based on the movement trajectory information, and calculates the brightness control amount to increase an amount of light of the illumination unit located in the predicted direction.

10. The system of claim 1, wherein the brightness control calculation unit acquires information on orientation of the person acquired by the motion sensor, predicts the direction that the person moves based on the information on the orientation, and calculates the brightness control amount to increase an amount of light of the illumination unit located in the predicted direction.

11. The system of claim 1, wherein
   the motion sensor acquires specific marker information shown by the person in the management area, and
   the brightness control calculation unit acquires the marker information acquired by the motion sensor and calculates the brightness control amount to control the amount of light of the illumination unit based on the marker information.

12. The system of claim 1, further comprising a database server acquiring and storing person detection result information, movement trajectory information, illumination control history information, sensing history information by the motion sensor in the management area.

13. An illumination control method using an illumination control system connected to an illumination unit installed in a management area, comprising:
   holding position information of the illumination unit and necessary light amount information for action information of a person in the management area;
   acquiring position information of the person and action information of the person in the management area;
   acquiring a necessary amount of light corresponding to the acquired action information of the person based on the held necessary light amount information;
   calculating a brightness control amount based on the position information of the illumination unit to set the acquired necessary amount of light at a place indicated by the acquired position information of the person; and
   controlling the illumination unit with the calculated brightness control amount.

* * * * *